No. 661,571. Patented Nov. 13, 1900.
W. ZOELLER.
MOLDING MACHINE.
(Application filed Apr. 20, 1900.)
(No Model.) 14 Sheets—Sheet 1.
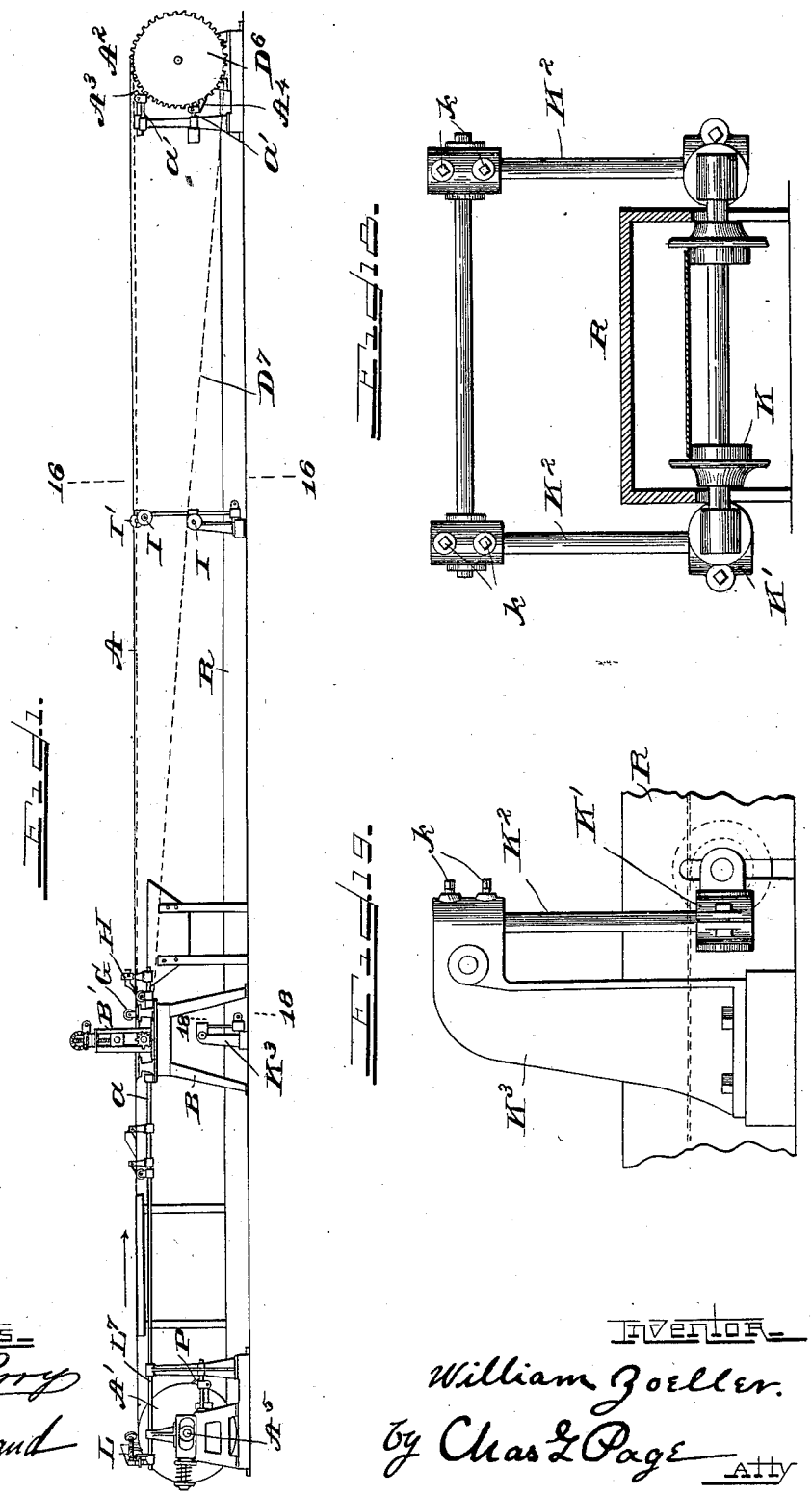

No. 661,571. Patented Nov. 13, 1900.
W. ZOELLER.
MOLDING MACHINE.
(Application filed Apr. 20, 1900.)
(No Model.) 14 Sheets—Sheet 2.
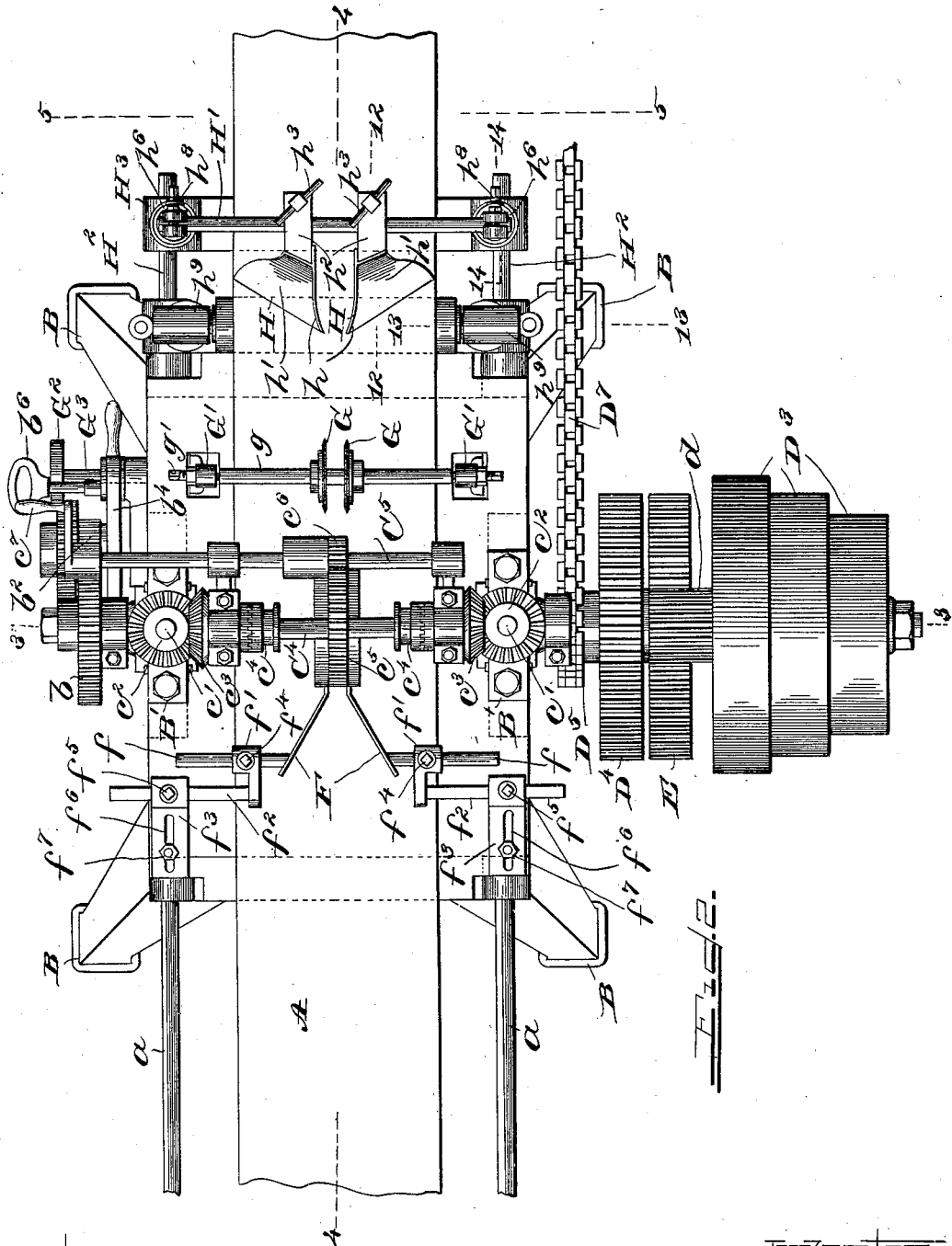

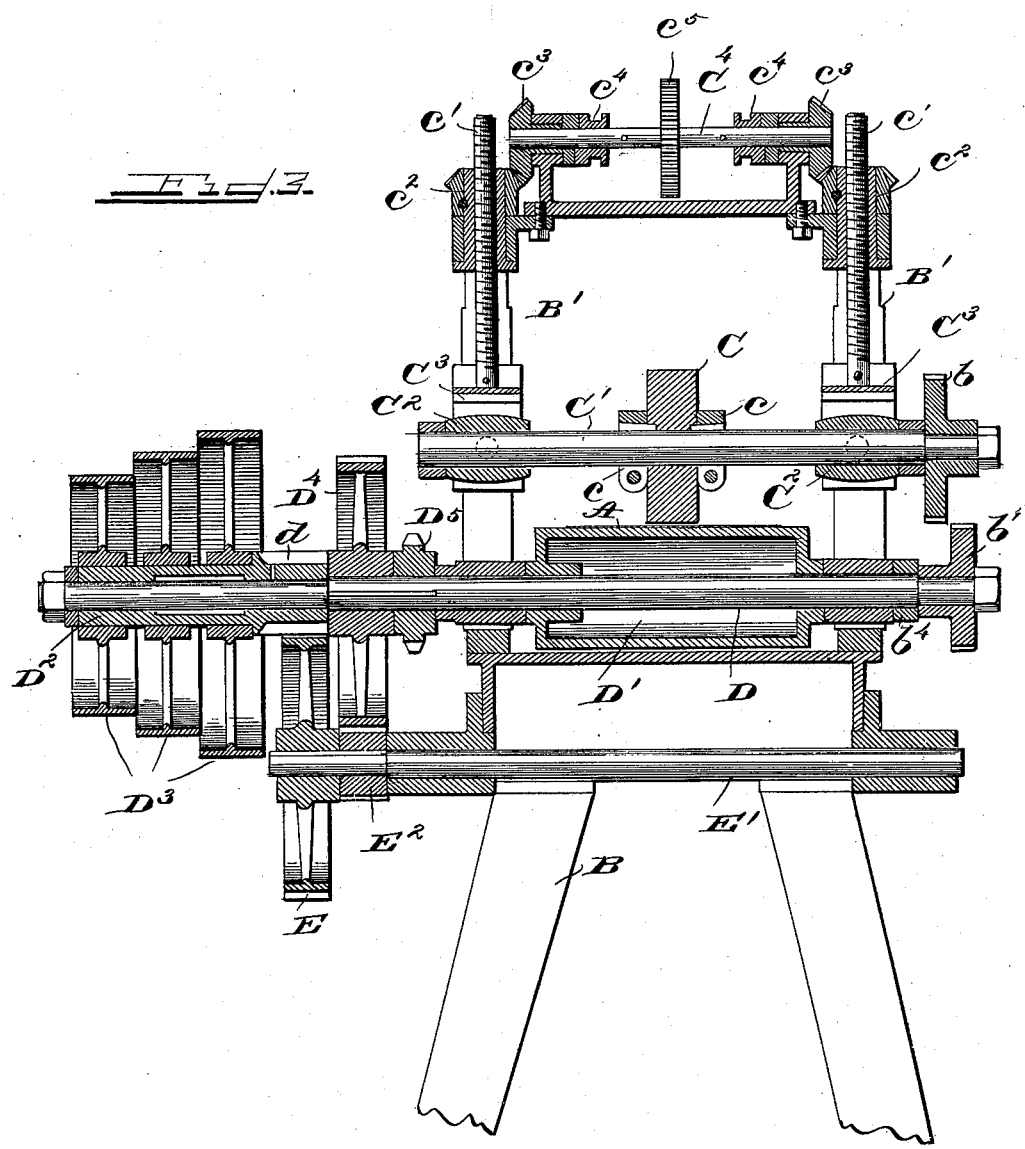

No. 661,571. Patented Nov. 13, 1900.
W. ZOELLER.
MOLDING MACHINE.
(Application filed Apr. 20, 1900.)
(No Model.) 14 Sheets—Sheet 4.
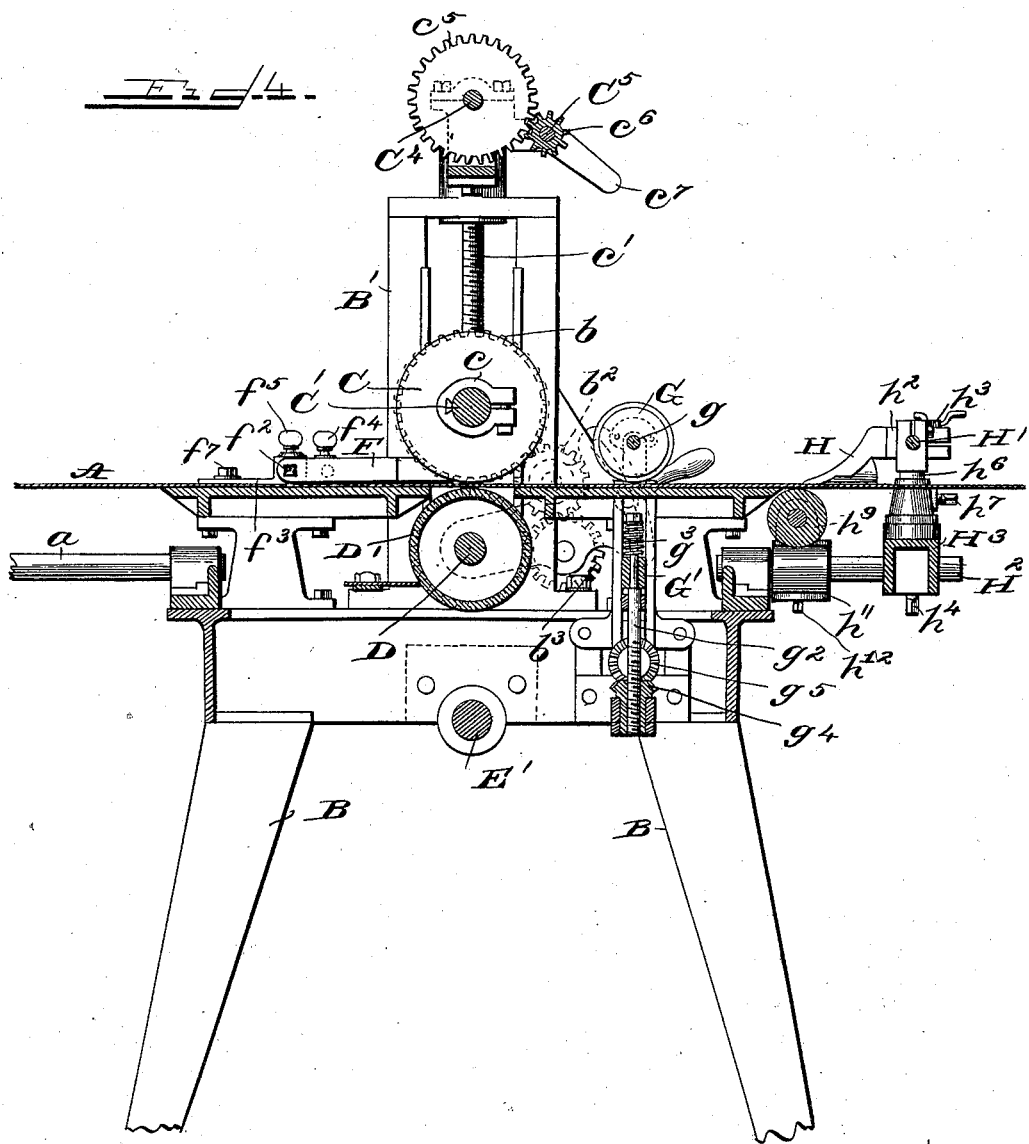

No. 661,571. Patented Nov. 13, 1900.
W. ZOELLER.
MOLDING MACHINE.
(Application filed Apr. 20, 1900.)
(No Model.) 14 Sheets—Sheet 5.
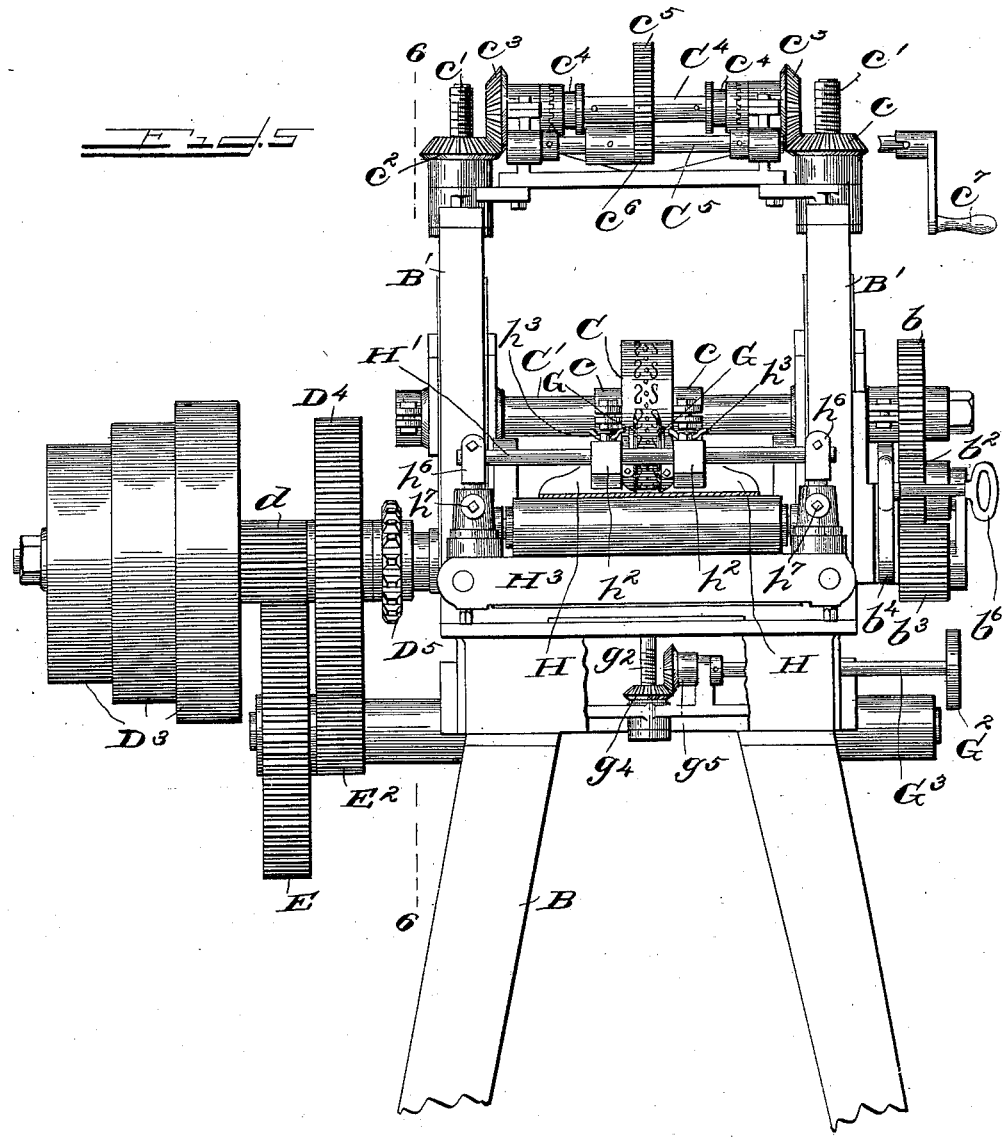

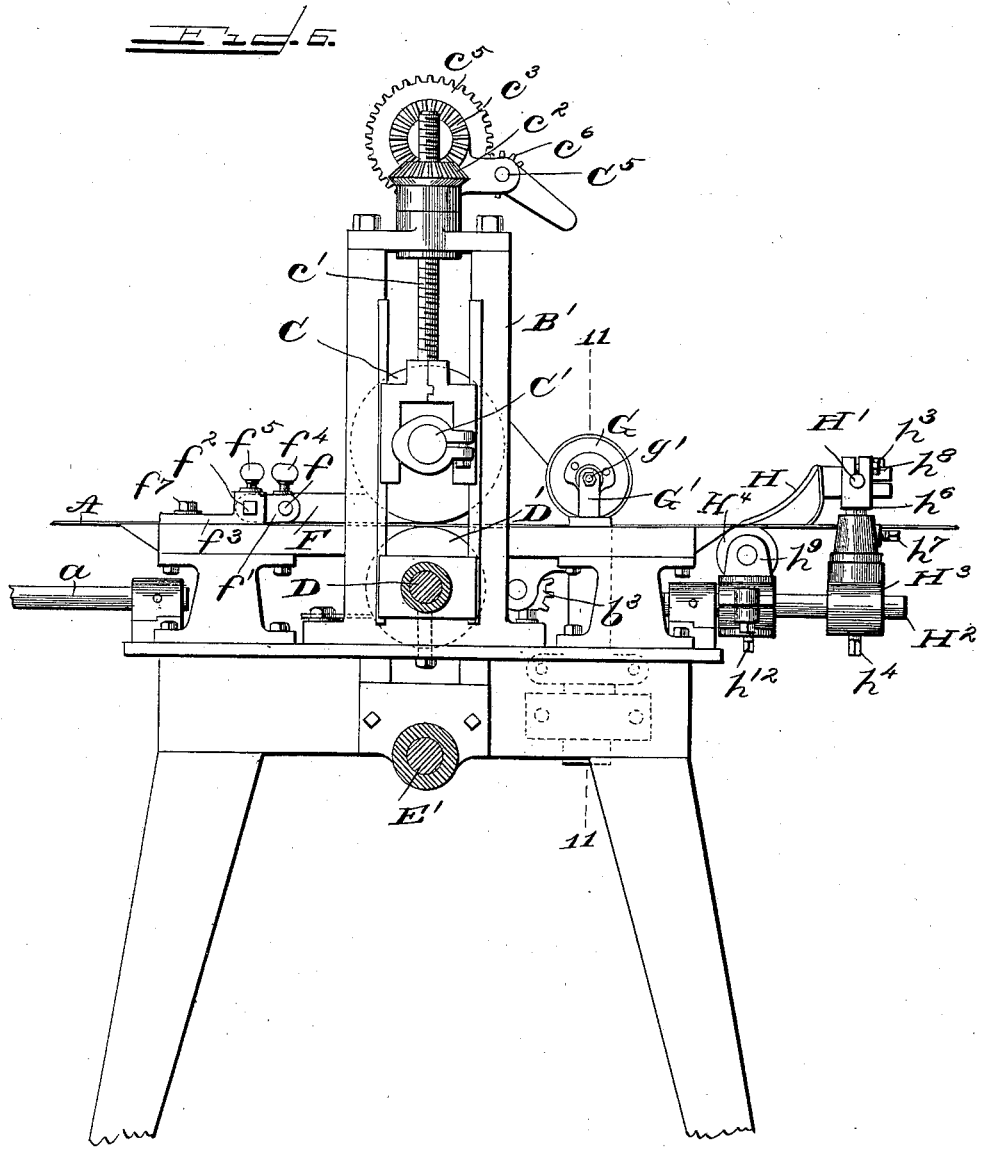

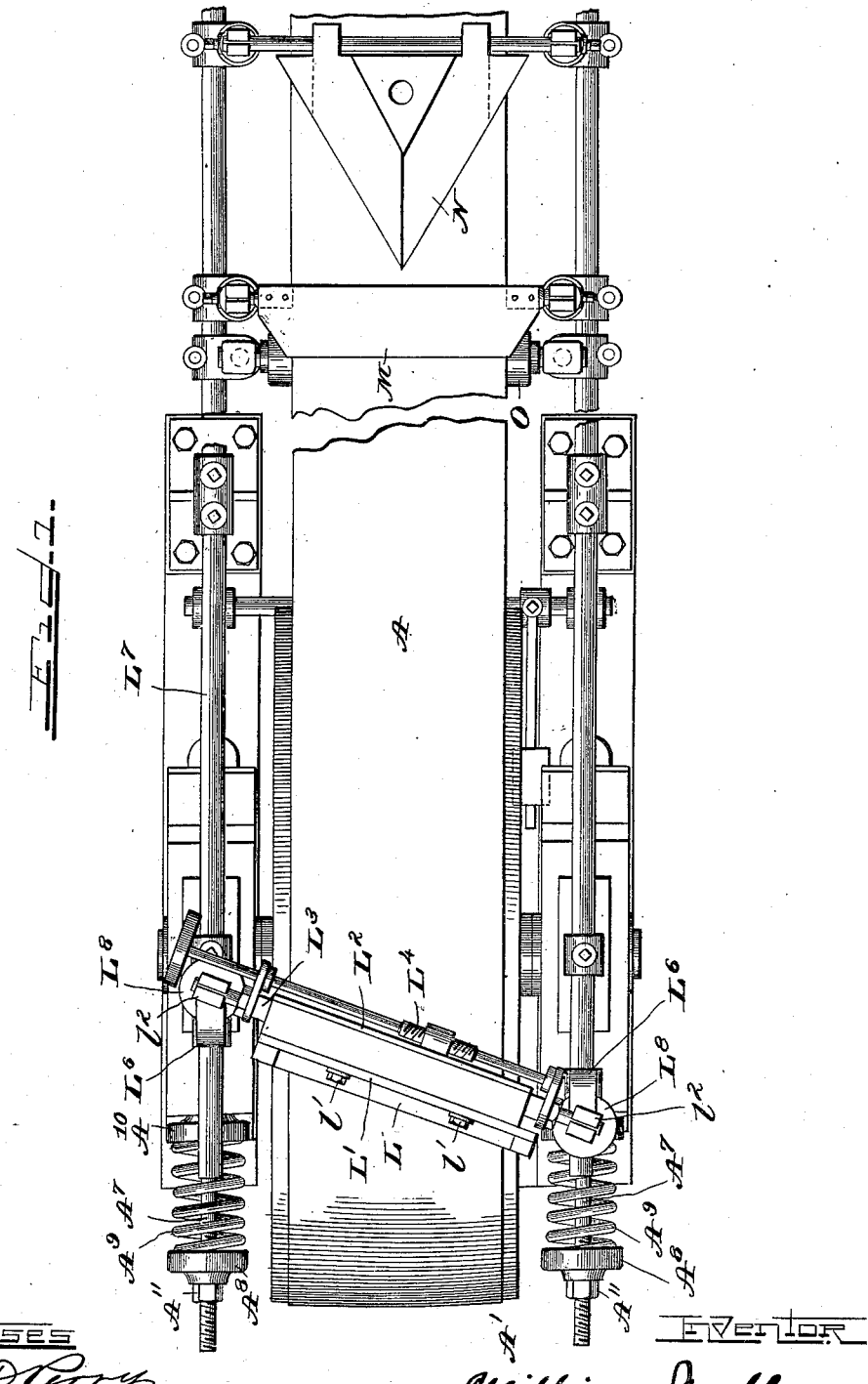

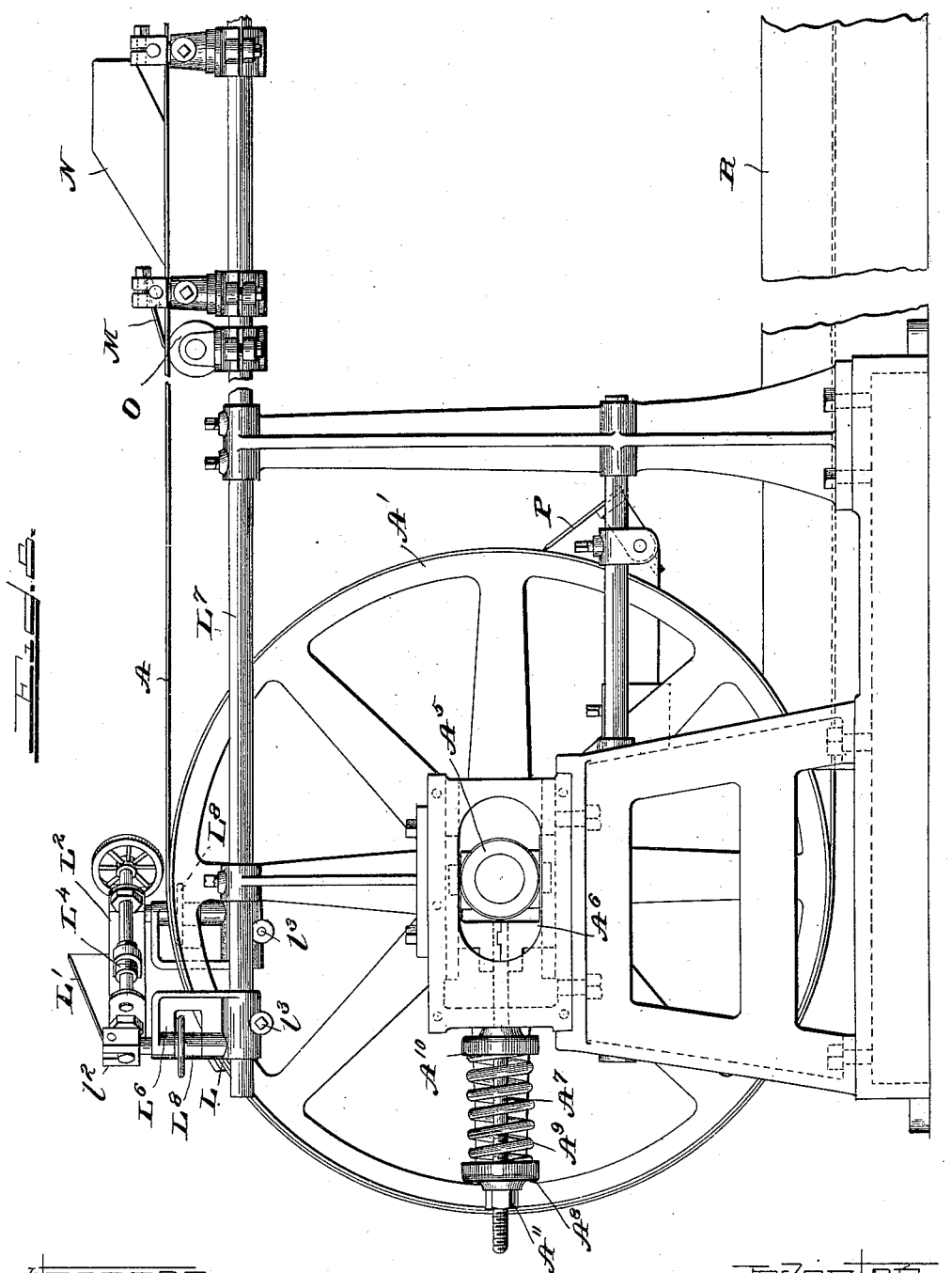

No. 661,571. Patented Nov. 13, 1900.
W. ZOELLER.
MOLDING MACHINE.
(Application filed Apr. 20, 1900.)
(No Model.) 14 Sheets—Sheet 9.
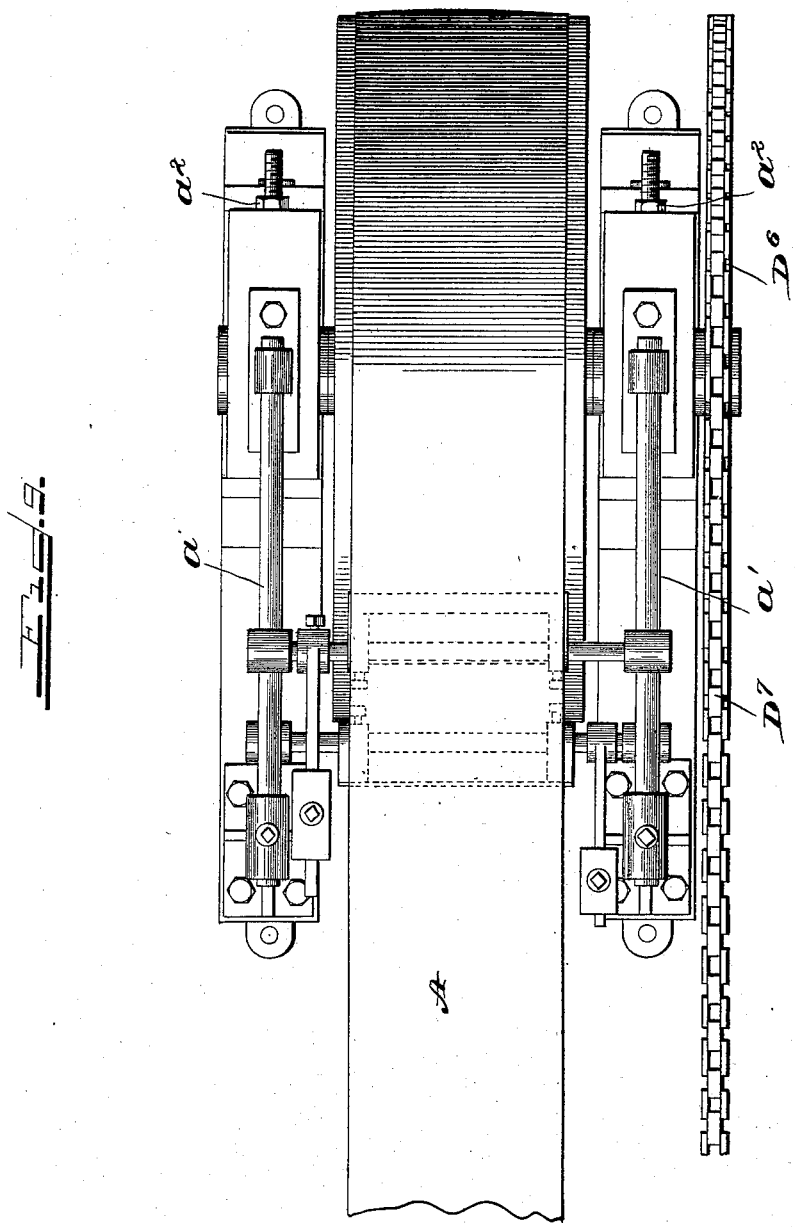

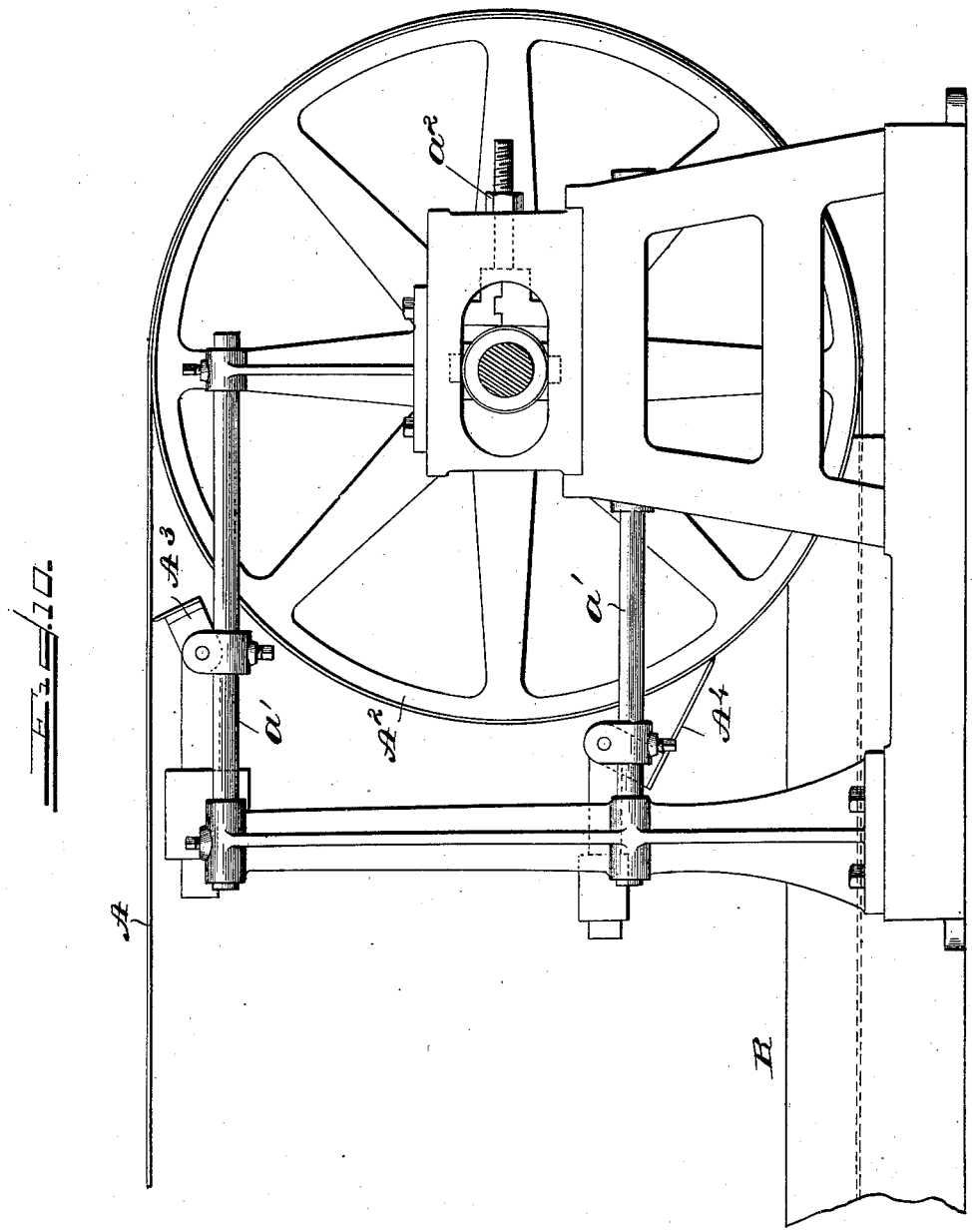

No. 661,571. Patented Nov. 13, 1900.
W. ZOELLER.
MOLDING MACHINE.
(Application filed Apr. 20, 1900.)
(No Model.) 14 Sheets—Sheet 11.
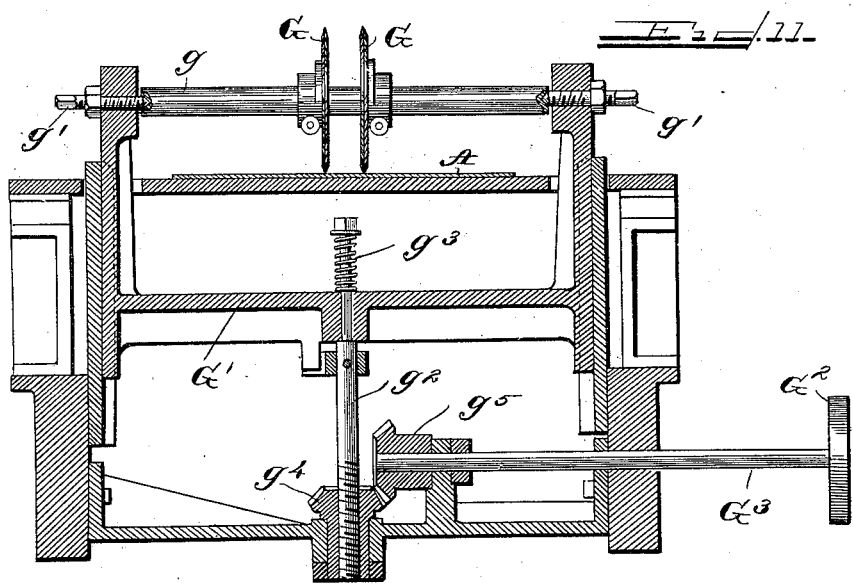
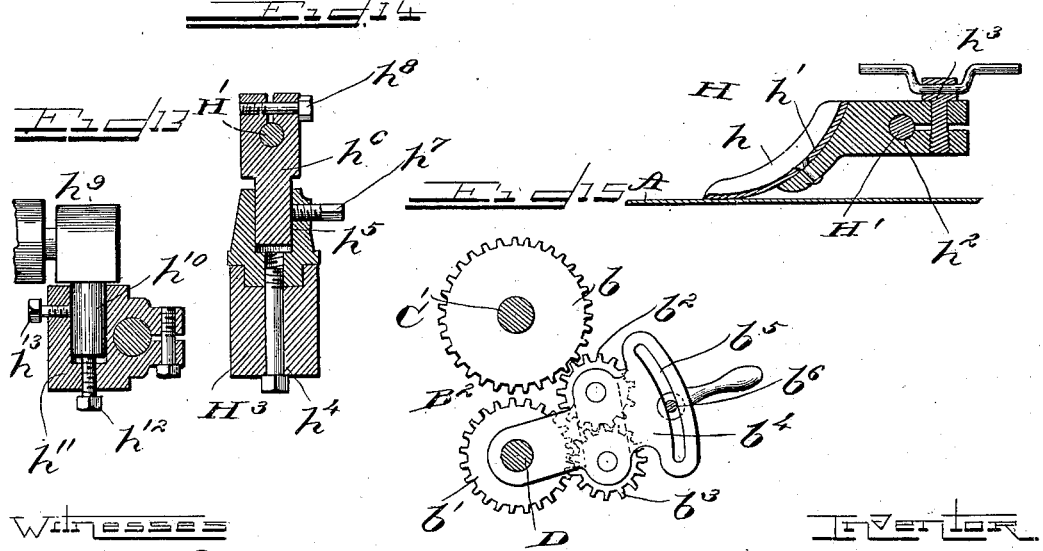
Witnesses
Ira D. Perry
A. F. Denand
Inventor
William Zoeller
by Chas. L. Page Atty No. 661,571. Patented Nov. 13, 1900.
W. ZOELLER.
MOLDING MACHINE.
(Application filed Apr. 20, 1900.)
(No Model.) 14 Sheets—Sheet 12.
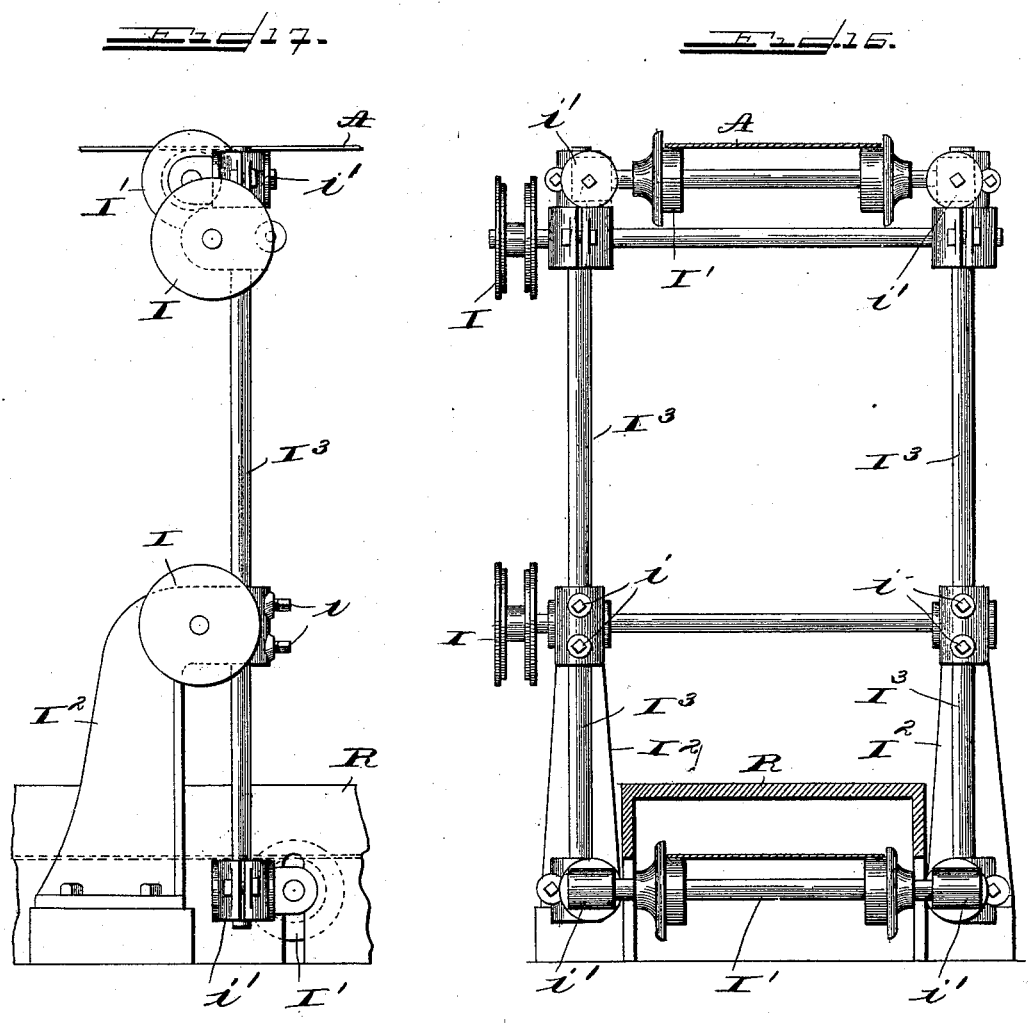

No. 661,571. Patented Nov. 13, 1900.
W. ZOELLER.
MOLDING MACHINE.
(Application filed Apr. 20, 1900.)
(No Model.) 14 Sheets—Sheet 13.
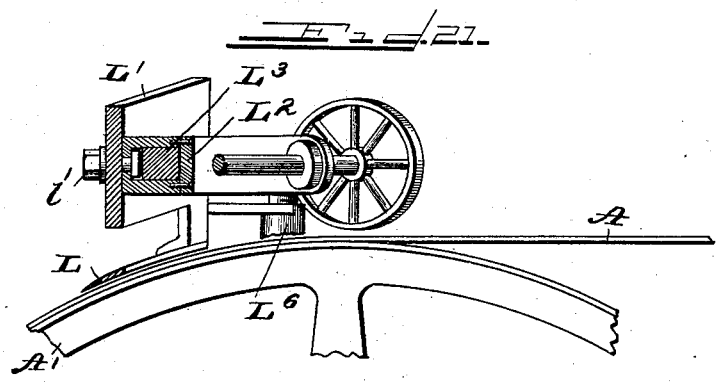
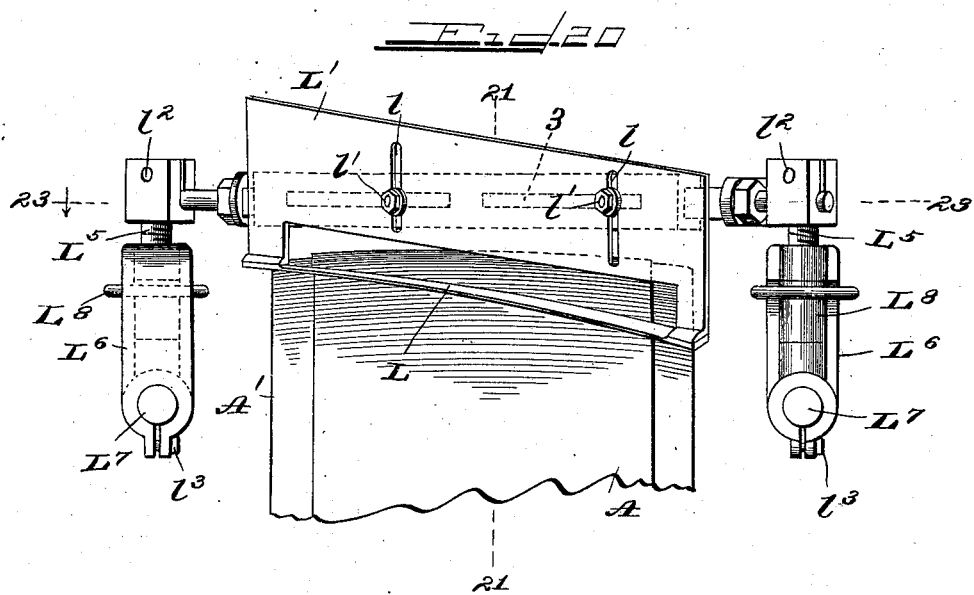
Witnesses
Ira D. Perry
A. F. Durand
Inventor
William Zoeller
by Chas. L. Page Atty

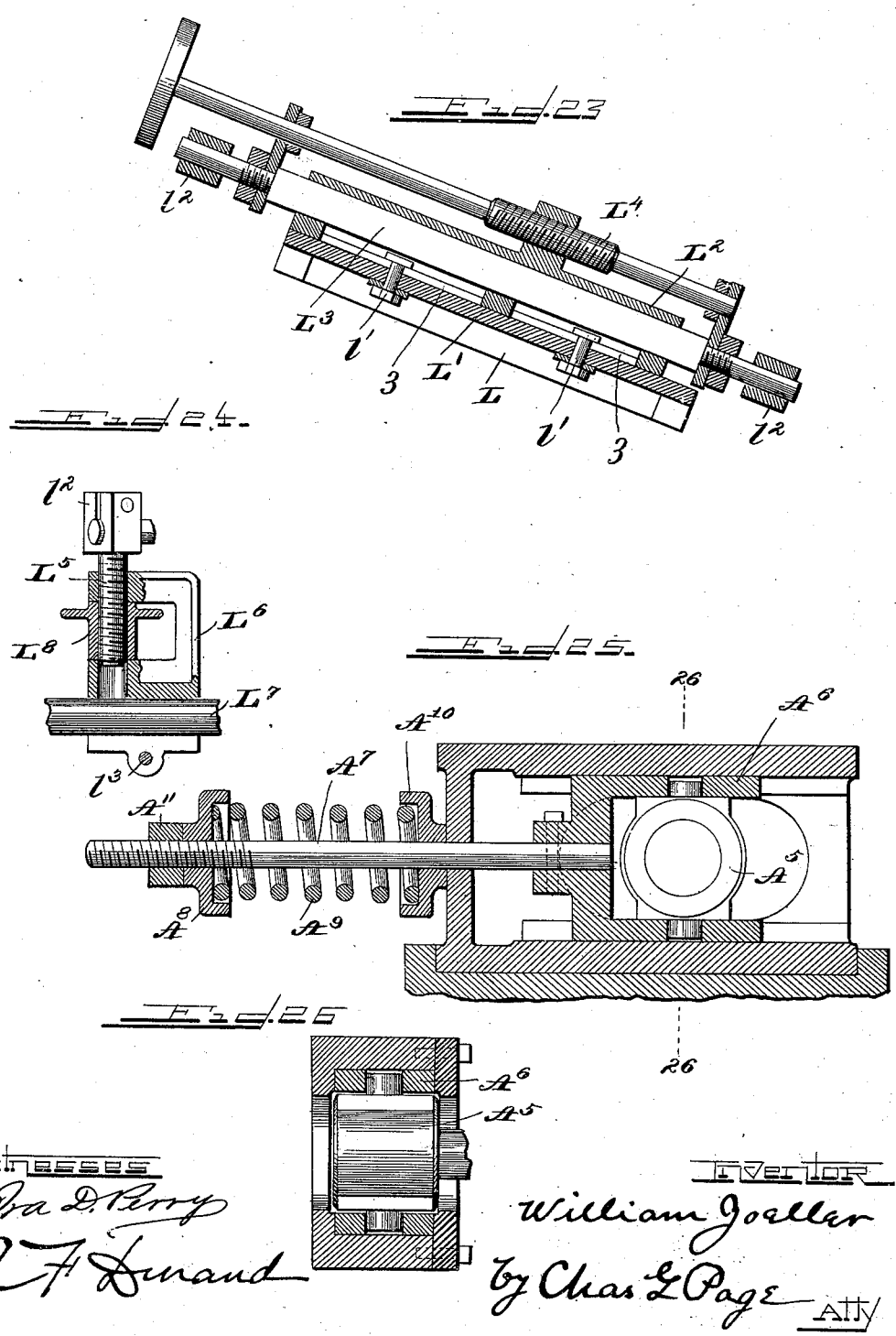

United States Patent Office.

WILLIAM ZOELLER, OF CHICAGO, ILLINOIS.

MOLDING-MACHINE.

SPECIFICATION forming part of Letters Patent No. 661,571, dated November 13, 1900.

Application filed April 20, 1900. Serial No. 13,626. (No model.)

*To all whom it may concern:*

Be it known that I, WILLIAM ZOELLER, a citizen of the United States, residing at Chicago, county of Cook, State of Illinois, have invented a certain new and useful Improvement in Molding-Machines, of which the following is a specification, reference being had to the accompanying drawings, forming part thereof.

My invention relates to machines for making the ornamental relief-work employed in manufacturing picture-molding, and more particularly to machines which produce this relief-work or "ornament," as it is commonly called, by subjecting a suitable plastic material to the embossing action of a figured roll or rotary die.

Objects of my invention are to provide a simple and easily-operated machine which will produce the said ornament in such form that it can be readily applied to picture-molding or other like articles for the purpose of ornamentation; to provide a construction which will make the operation of producing the ornament practically continuous—that is to say, which will permit such ornament to be molded in a continuous strip which can be cut off in suitable lengths as fast as it is formed; to provide a construction involving an endless band or belt adapted to provide a traveling support for the composition and also involving means for first embossing or ornamenting the plastic composition as it moves along with the band or belt and for then effectively shaving or paring off the ornament; to reduce the cost of the manufacture of picture-molding, and to provide certain details and features of improvement tending to increase the general efficiency and to render a machine of this character serviceable and thoroughly reliable.

To the attainment of the foregoing and other useful ends my invention consists in matters hereinafter set forth and claimed.

In the accompanying drawings, Figure 1 is a view more or less diagrammatic in character and illustrating in side elevation a molding-machine involving the principles of my invention. Fig. 2 is a plan of the middle or central portion of the machine shown in Fig. 1. Fig. 3 is a transverse section on line 3 3 in Fig. 2. Fig. 4 is a longitudinal section on line 4 4 in Fig. 2. Fig. 5 is a transverse section on line 5 5 in Fig. 2. Fig. 6 is a vertical section on line 6 6 in Fig. 5, showing the side of the machine with the pulleys and gearing removed. Fig. 7 is a plan of the left-hand end of the machine shown in Fig. 1. Fig. 8 is a side elevation of the portion of the machine shown in Fig. 7. Fig. 9 is a plan of the right-hand end of the machine shown in Fig. 1. Fig. 10 is a side elevation of the portion of the machine shown in Fig. 9. Fig. 11 is a transverse section on line 11 11 in Fig. 3. Fig. 12 is a vertical section of one of the plow-shaped trimmers on line 12 12 in Fig. 2. Fig. 13 is a vertical section on line 13 13 in Fig. 2. Fig. 14 is a vertical section on line 14 14 in Fig. 2. Fig. 15 is a detail of the expansion-gearing which connects the two roll-shafts. Fig. 16 is a vertical section on line 16 16 in Fig. 1. Fig. 17 is a side elevation of that portion of the machine shown in Fig. 16. Fig. 18 is a vertical section on line 18 18 in Fig. 1. Fig. 19 is a side elevation of that portion of the machine shown in Fig. 18. Fig. 20 is an end view of the upper portion of the left-hand end of the machine, showing the knife which shaves or pares off the ornament and also showing the devices by which said knife is adjusted. Fig. 21 is a vertical section on line 21 21 in Fig. 20. Fig. 22 is a section through the rim of one of the band-wheels and also through the band or belt, showing the crowned peripheries with which said wheels are provided. Fig. 23 is a horizontal section on line 23 23 in Fig. 20. Fig. 24 is a detail of one of the devices for adjusting the knife vertically. Fig. 25 is a sectional view illustrating one of the sliding or adjustable bearings for the band-wheel at the left. Fig. 26 is a vertical section on line 26 26 in Fig. 25.

The molding-machine thus illustrated comprises an endless band or belt A, trained over pulleys or band-wheels A' and A². This band serves as a traveling support for the plastic composition from which the ornament is molded, and at a point between the two band-wheels I arrange a stand or body-frame B, suitable for supporting the means for embossing or ornamenting said composition as it moves along on the upper surface of said band or belt. The plastic composition is placed upon the upper leaf of the band or belt at *a*, and the said embossing or ornamenting means consists of a figured roll or rotary die C. This roll is mounted upon a rotary shaft C', which is arranged transversely above the upper leaf of the band. Preferably a couple of split collars $c$ are clamped upon the shaft and suitably keyed to the roll. This avoids grooving or otherwise marring the shaft. The end portions of said shaft are supported in bearings $C^2$, which are pivoted or trunnioned in boxes $C^3$. These boxes are arranged to slide up and down in guideways provided by the housings or standards B', which rise from the top of the stand or body-frame B. The said boxes are secured to the lower ends of the threaded rods or stems $c'$, which are supported by the rotary adjusting-nuts $c^2$, suitably mounted in the upper portions of the said housings. These adjusting-nuts are provided with teeth which mesh with the teeth of the bevel-gears $c^3$, loosely mounted upon the horizontal and transversely-arranged shaft $C^4$. The hub portions of these bevel-gears are adapted to engage the sliding clutch members $c^4$, which are on a feather or spline, and a gear-wheel $c^5$ is keyed to the shaft at a point between the said sliding clutch members. A shaft $C^5$, mounted in suitable bearings and having a pinion $c^6$, which engages the gear $c^5$, is provided at its end with a crank $c^7$. Obviously with this arrangement the roll C and shaft C' can be raised and lowered at will. By closing both clutches and turning the crank the said shaft and roll can be raised and lowered bodily, while by closing but one clutch and then turning the crank the shaft C' can be inclined or placed at an angle should the character of the work require that the roll C be tilted to one side.
Supported in suitable bearings and arranged transversely below the upper leaf of the band or belt is a shaft D. This shaft is provided with a roll D', which bears against the under surface of the band and which supports the same against the downward pressure of the impression-roll C. The shafts C' and D are connected by the expansion-gearing $B^2$. This expansion-gearing consists of the gears $b$ and $b'$, mounted, respectively, upon the shafts C' and D, and the pinions $b^2$ and $b^3$, mounted upon the plate $b^4$, which swings about the shaft D. The said plate is provided with a segmental slot $b^5$, through which extends a locking-screw $b^6$. With this arrangement the shaft C' is driven from shaft D through the medium of the said expansion-gearing, and the said shaft C' can be raised and lowered at will, the swinging plate $b^4$ permitting the pinion $b^2$ to be maintained in engagement with the gear $b$ regardless of the latter's position. The opposite end portion of the shaft D is provided with a loose sleeve $D^2$. A number of different-sized pulleys $D^3$ are keyed upon the sleeve, and a gear $D^4$ and a sprocket $D^5$ are keyed directly to the shaft. The inner end of the said sleeve is provided with teeth $d$, which engage a gear E on the shaft E'. A pinion $E^2$ on said shaft E' engages the gear $D^4$. In this way power applied to one of said pulleys is transmitted to the shaft D through the medium of the sleeve and the gearing, and the band or belt is driven from this shaft through the medium of the sprockets $D^5$ and $D^6$ and the sprocket-chain $D^7$. The gearing is preferably so proportioned that the belt has the same velocity as the periphery of the impression-roll.

As previously stated, the plastic composition is placed upon the band or belt at $a$, and for the purpose of directing it to the impression-roll I provide a pair of guides F. Each guide is provided with a stem $f$, which slides in a socket-piece $f'$, and each socket-piece is in turn provided with a stem $f^2$, which slides in a socketed bracket $f^3$, secured to the top of the stand or body-frame B. Set-screws $f^4$ and $f^5$ lock the stems in their sockets. The said brackets are provided with slots $f^6$ and are secured to the upper surface of the body-frame by bolts $f^7$. With this arrangement the guides can be adjusted toward or away from the roll, and as they have telescoping or extensible connections with the body-frame they can also be adjusted laterally, so as to vary the width of the strip of plastic material as it moves beneath the roll. The first adjustment is secured by loosening the bolt $f^7$ and the last or lateral adjustment by loosening the set-screws $f^4$ and $f^5$. After being embossed or ornamented by the impression-roll the plastic composition is carried along by the traveling band, and the surplus marginal portions of the composition are then separated from the central or embossed portion by the rotary cutters G. These cutters consist of disks mounted upon a shaft $g$ and provided with sharp edges which contact with the upper surface of the band or belt. The said shaft is carried by a vertically-adjustable frame G' and rotates upon cone-bearings provided by the tapered ends of the screws $g'$. The stem or rod $g^2$ has a yielding connection with the said frame by reason of the spring $g^3$, and the threaded lower end portion of this stem or rod is engaged by the threaded bore of a bevel-gear $g^4$. Said bevel-gear is suitably mounted in a bearing on the body-frame and serves as an adjusting-nut for raising and lowering the cutters. This adjusting-nut is easily and conveniently rotated by a hand-wheel $G^2$, secured to the outer end of a shaft $G^3$, which is provided at its inner end with a bevel $g^5$, engaging the teeth of said nut. In this way the frame and cutters can be adjusted vertically, and it will be seen that the spring $g^3$ permits the cutters to automatically rise and avoid breakage should they be brought into contact with some hard object or substance embedded in the composition. Each cutting-disk is adjustably clamped upon the shaft $g$, and in this way the distance between the two disks can be varied according to the width of ornament being made. After being thus separated or cut off the surplus marginal portions of the composition are then trimmed and scraped off from the band by the two trimmers H. It will be observed that each trimmer is plow-shaped, being provided with a knife $h$ and a moldboard $h'$, and that consequently the marginal portions of the composition are by them scraped up and directed off at either side of the band. Each trimmer is provided with a split shank $h^2$, which clamps upon the rod H', and the screws $h^3$ permit the trimmers to be readily adjusted along the rod, it being understood that it is desirable to keep the points of the trimmers in line with the cutting-disks. As a simple and effective arrangement whereby the trimmers may be adjusted vertically and also toward and away from the cutters I arrange a rod or bar $H^2$ at each side of the machine, and upon these rods I mount a bar or casting $H^3$, having suitable clamping means or devices for clamping it at any point along the length of said rods. Removably secured by bolts $h^4$ to the top of said bar or clamping-piece are the socket-pieces $h^5$, and adjustably secured in the sockets of the latter are the stems $h^6$. The said stems can be adjusted up and down in their sockets and locked at any point by the set-screws $h^7$, and the heads of the stems are split and provided with screws $h^8$ and adapted to receive and securely hold the end portions of the rod H'. Thus it will be seen that the distance between the trimmers can be varied at will, that they can be readily adjusted vertically, and also that they can be moved toward or away from the cutters. Below the points of the trimmers I arrange a roll $H^4$, which bears against the under side of the band and which is mounted in vertically-adjustable bearings. These bearings $h^9$ are provided with stems $h^{10}$, which are adjustably supported in sockets formed in the clamping-pieces $h^{11}$. The said clamping-pieces are adjustably clamped upon the rods $H^2$. Adjusting-screws $h^{12}$ are provided for raising and lowering the stem, and set-screws $h^{13}$ lock the latter in their adjustments. With this arrangement the roll can be raised and lowered, and it can also be adjusted along the under side of the band.

The embossed or ornamented composition after passing between the trimmers moves along with the upper leaf of the band or belt and passing around the band-wheel $A^2$ then moves along with the lower leaf in an opposite direction. In order to permit the band or belt to be properly trained, both band-wheels are provided with crowned peripheries. A scraper $A^3$ cleans the inner surface of the band before it runs onto the band-wheel $A^2$, and a similar scraper $A^4$ cleans the periphery of said wheel. The said scrapers are adjustably mounted upon the rods $a'$, and both are, it will be observed, counterweighted to keep them in contact. The long sprocket-chain $D^7$ is supported by idlers I, and the band is also supported at this point by idlers I'. These idler-rolls are all carried by a frame composed of the brackets $I^2$ and the vertical and oppositely-arranged rods $I^3$. The said rods are adjustably supported by the brackets and held in place by the set-screws $i$. The idlers I' are mounted in bearings $i'$, which are adjustably clamped upon the said rods. In this way the idler-rolls are capable of vertical adjustment and can be positioned to suit the requirements. The idlers I are preferably so formed that their peripheries contact with only the side portions of the chain. This avoids the objectionable vibration which would result from permitting the idlers to contact with the other portions of the chain. The lower leaf of the band or belt is also supported by an idler-roll K, arranged below the stand or body-frame B. Said roll is mounted in bearings K', which are adjustably clamped upon the rods $K^2$. These rods are adjustably supported by the bracket $K^3$ and are held in place by the set-screws $k$.

The band-wheel A' is mounted in bearings $A^5$. These bearings are pivoted or trunnioned in boxes $A^6$, which slide in ways formed in the two upright frames which support the wheel. Each box $A^6$ is provided with a threaded stem $A^7$. A cup-shaped washer $A^8$ is arranged upon each stem, and the coil-springs $A^9$ are arranged for compression between these washers and similar washers $A^{10}$, which bear against the frames. The washers $A^8$ are backed by nuts $A^{11}$. By rotating these nuts the boxes $A^6$ can be adjusted along their ways, so as to tighten up the band, and as the bearings are pivoted or trunnioned in these boxes the wheel can be skewed by tightening up one side only, this being necessary at times in order to properly train the band. The springs $A^9$ permit the band-wheel to yield or shift in case some object or substance comes between the band and one of the wheels. In this way breakage due to a sudden increase in the tension of the band is avoided. By the time the embossed composition reaches the left-hand end of the machine it has become dry or hard enough to permit the ornament to be shaved or pared off and removed from the machine. This is accomplished by providing a knife L, which is adjusted so as to pare off the ornament as it moves along, leaving the residue or balance of the composition still sticking to the band. The ornament slides over the knife, while the residue passes beneath, and the ornament or strip of embossed composition thus separated from the band can now be cut off in suitable lengths and lifted from its traveling support. The knife is preferably arranged diagonally or obliquely to the line of progression, so as to have a shearing effect or action, and as the band while passing over the crowned wheel is convex in cross-section the knife is therefore preferably twisted or spiral in form, so as to permit it to conform to the curved surface of the said band. In this way the edge of the knife is presented at a uniform distance from the band for the full length of the knife, and at the same time such edge can be straight and of a character to insure a uniform or like shearing action along its entire length. This will be understood by an inspection of Figs. 21, 20, and 7 of the drawings. Fig. 21 shows the conformation of the knife to the curvature of the band, and Fig. 20 shows the twist or spiral form of the knife, while from Fig. 7 it will be seen that the edge of the knife when viewed from above is perfectly straight and that for this reason the shearing action is, as stated, uniform for the full length of the knife. The plate $L'$, to which the knife is secured, is provided with vertical slots $l$ and is secured to the frame $L^2$ by bolts $l'$. These bolts extend through horizontal slots 3 in said frame, and with this construction it will be readily seen that the knife can be adjusted vertically and also horizontally by simply loosening the nuts of said bolts. This, however, is a rough adjustment, and for the purpose of securing a more delicate and accurate adjustment I provide the following devices: The frame $L^2$ is slidably mounted upon a bar $L^3$, and an adjusting-screw $L^4$ is provided for adjusting the frame along said bar, so as to move the knife endwise. The cylindric end portions of said bar are mounted in the split heads of the stems $L^5$ and are clamped therein by the screws $l^2$. By loosening these screws the bar $L^3$ can be partially rotated, so as to raise or lower the heel of the knife, and thereby facilitate the cutting. The stems $L^5$ are threaded and supported by brackets $L^6$, adjustably clamped upon the rods $L^7$. Each stem is provided with an adjusting-nut $L^8$, and by rotating these nuts the stems can be raised or lowered, thereby giving the knife a delicate vertical adjustment. The brackets $L^6$ are clamped upon the rods $L^7$ by screws $l^3$, and by adjusting these brackets along said rods the angularity of the knife can be varied at will and the shearing action of the knife thereby regulated to suit the character of the work. After the ornament is shaved off and removed from the band the residue then moves along and is scraped up and separated from the band by the scraper M. The movement of the band forces the residue over the scraper, where it is then directed off at either side by the deflector N. This leaves a clear or clean surface at the point where the plastic composition is fed to the band. A roll O supports the band against the downward pressure of the said scraper. The devices thus provided for disposing of the residue and cleaning the band for the reception of the fresh composition are, it will be observed, all adjustably mounted upon the rods $L^7$, which extend along the band at either side thereof. A scraper P is also provided for scraping the periphery of the band-wheel $A'$. The lower leaf of the endless band, which is preferably of steel or some other suitable metal, can be inclosed in a housing or box R. The bearings of the wheel $A^2$ are swiveled, so as to permit the wheel to be skewed for the purpose of properly training the band, and as these swiveled bearings are similar to those already described a detailed description thereof will not be necessary. It will be observed, however, that these bearings do not involve the use of the springs, as do those for the wheel $A'$, and that consequently the adjusting-nuts $a^2$ bear directly against the frame. Of the idler-rolls $I'$ those which support the upper leaf can be of any suitable form, while those for supporting the lower leaf are preferably recessed or cut away at their middle portions, so as to contact with only the marginal portions of the band, thereby permitting the embossed composition to pass these lower rolls without being mutilated or disfigured.

From the foregoing it will now be seen that I provide a machine whereby a plastic material can be molded or formed into a continuous strip of ornamental relief-work, which can be cut up into suitable lengths and readily applied to the picture-molding, that I form or mold the ornament without passing the wooden portion of the picture-molding through the machine, and that I provide a simple and easily-operated machine whereby the ornamentation for picture-molding can be rapidly and cheaply produced.

What I claim as my invention is—

1. In a molding-machine, the combination of a plurality of band-wheels having convex or crowned peripheries, a metal band trained over said wheels and adapted to serve as a traveling support for the plastic material, means for embossing said material as it moves along with said band, and a twisted or spiral knife arranged obliquely across the band, and in position to shave off the ornament, the spiral form of the knife permitting it to conform to the curved surface which the band presents while passing around one of said wheels, and the arrangement being such that the severed ornament passes over the knife and moves along with said band.

2. A molding-machine comprising a plurality of band-wheels, a metal band trained over said wheels and providing a traveling support for the plastic material, means for embossing said material as it moves along with said band, a bar extending transversely above the belt and having its ends mounted in bearings or blocks, said bearings being adjustable both horizontally and vertically, a knife adjustably mounted upon said bar and arranged in position to separate the ornament from the band, said ornament passing over the knife and moving on with said band, substantially as described.

3. A molding-machine comprising a couple of band-wheels mounted upon structures arranged at a suitable distance apart, a band trained over said wheels and providing a traveling support for the plastic material, a third structure arranged at a suitable point between said wheels and providing a support for an embossing-roll, a fourth structure arranged at a point between said roll and one of said wheels, idler-rolls mounted upon said fourth structure and arranged to support the upper and lower leaves of said band, said idler-rolls being vertically adjustable, and a knife for shaving off the ornament, said band being of a length to give the embossed material time to dry to the proper extent before reaching said knife, and the severed ornament passing over the knife and moving on with said band, substantially as described.

4. In a molding-machine, the combination of a traveling support for the plastic material, an embossing-roll or rotary die, a body frame or structure upon which said roll is mounted, guides arranged above the upper leaf of the band and adapted for guiding the plastic material to said roll, and horizontally disposed and telescoping or extensible connections between said guides and said body-frame, said connections being horizontally extensible in a direction transverse to said band, so as to permit the distance between the guides to be varied at will, substantially as described.

5. In a molding-machine, the combination of a traveling support for the plastic material, an embossing-roll, a vertically-adjustable frame having portions which extend upwardly at either side of said traveling support, a shaft arranged above said traveling support, screws extending through said upwardly-extending portions and having their ends engaging the ends of said shaft, a couple of disks adjustably clamped upon said shaft and provided with sharp edges which contact with the upper surface of said traveling support, a threaded stem secured to the lower portion of said vertically-adjustable frame, and bevel-gearing applied to said stem, substantially as and for the purpose set forth.

6. In a molding-machine, the combination of a traveling support for the plastic material, a shaft arranged above said support, a pair of split collars clamped upon said shaft, an embossing-roll arranged between and keyed to said collars, a second shaft arranged below said traveling support and gear connected with said first-mentioned shaft, a roll on said second shaft supporting said traveling support, a sleeve loosely mounted upon said second shaft and having its end portion formed with teeth, a plurality of different-sized pulleys secured to said sleeve, a third shaft, a gear-wheel on said third shaft engaging the teeth on said sleeve, a gear-wheel on said second shaft, and a pinion on said third shaft engaging said last-mentioned gear-wheel, the said sleeve rotating in the same direction as the shaft upon which it is mounted, but at a higher rate of speed, substantially as and for the purpose set forth.

7. In a molding-machine, the combination of a couple of band-wheels, a metal band trained over said wheels and providing a traveling support for the plastic material, an embossing-roll, a structure arranged between said roll and one of said band-wheels, said structure comprising a pair of vertically-disposed and adjustably-supported rods arranged at either side of said band, bearings adjustably secured upon the upper end portions of said rods, an idler-roll journaled in said bearings and supporting the upper leaf of said band, similar bearings secured to the lower end portions of said rods, an idler-roll journaled in said bearings and supporting the lower leaf of said band, said last-mentioned roll being recessed at its middle to permit the embossed material to pass, and a knife for paring or shaving off the ornament, the length of the band being sufficient to give the embossed material time to dry to the proper extent before reaching said knife, substantially as described.

8. A molding-machine comprising a plurality of pulley or band wheels, a metal band or belt trained over said wheels and adapted to provide a traveling support for the plastic material, an impression-roll for embossing said material as it moves along with said band or belt, a knife for shaving off the ornament, the distance between said knife and the impression-roll being sufficient to give the embossed material time to dry to the proper extent before reaching the knife, and the said knife being arranged in such manner that the severed ornament passes over the knife and then moves along resting upon the residue, substantially as described.

9. A molding-machine comprising an endless band or belt adapted to serve as a traveling support for the plastic material, a rotary die or impression-roll, and a knife for shaving off the ornament as it moves along with said belt, the arrangement being such that the severed ornament passes over the knife and continues its forward movement resting upon the residue, substantially as described.

10. A molding-machine comprising an endless metal belt adapted to provide a traveling support for the plastic material to be embossed or ornamented, an impression-roll arranged above the upper leaf of said belt and provided with a periphery suitable for embossing or ornamenting the composition as it moves along with the said belt, knives for trimming off the surplus marginal portions of the composition after passing under the impression-roll, a knife for separating the ornament from the belt, means for removing the residue from the belt, and means for driving said belt.

11. A molding-machine comprising a plurality of pulleys or belt-wheels having crowned peripheries, an endless steel band or belt trained over said wheels and adapted to provide a traveling support for the composition or other plastic material, means for driving said belt, an impression-roll arranged above the upper leaf of said belt, a pair of circular cutters and a pair of plow-shaped trimmers for cutting and trimming off the surplus marginal portions of the composition after it passes under the said impression-roll, a spiral-shaped knife arranged over one of said pulleys or belt-wheels and adapted to separate the ornament from the belt or band, and a scraper and a deflector for removing the residue from the said belt.

12. A molding-machine comprising a plurality of pulleys or belt-wheels having crowned peripheries, an endless band or belt trained over said wheels and adapted to provide a traveling support for the plastic material to be operated upon, an impression-roll arranged above the upper leaf of said belt and provided with a periphery suitable for embossing or ornamenting the plastic material as it moves along with the said band or belt, means for trimming off the surplus marginal portions of the plastic material after passing from under the said roll, a knife for separating the embossed or ornamental material from the band or belt, means for removing the residue therefrom, scrapers for scraping the peripheries of the wheels over which the band or belt is trained, and means for scraping the inner surface of said band or belt.

13. A molding-machine comprising a plurality of band-wheels having crowned peripheries, an endless steel band trained over said wheels and adapted to provide a traveling support for the plastic material to be operated upon, means for embossing or ornamenting said material as it moves along with said band, a spiral knife arranged over one of said wheels and adapted to sever the ornament from the band, means for removing the residue therefrom, and adjusting devices adapted and applied for adjusting said knife.

14. A molding-machine comprising a plurality of band-wheels having crowned peripheries, an endless steel band trained over said wheels and adapted to provide a traveling support for the composition, means for embossing or ornamenting said composition as it moves along with the said band, means for trimming off the surplus marginal portions of the composition, a knife for severing the ornament from the band, means for removing the residue therefrom, and adjusting devices adapted and applied for adjusting the said knife vertically and horizontally and for raising and lowering the heel of the same so as to vary its angle, substantially as and for the purpose set forth.

15. A molding-machine comprising a plurality of band-wheels, an endless band trained over said wheels and adapted to provide a traveling support for the plastic material to be treated, springs applied to one of said wheels for the purpose set forth, means for driving said belt, means for embossing or ornamenting said plastic material as it moves along with said belt, and means for separating the ornament from the belt.

16. A molding-machine comprising a plurality of band-wheels having crowned peripheries, an endless band trained over said wheels and adapted to provide a traveling support for the plastic material to be treated, means for driving said band, means for embossing or ornamenting said material as it moves along with said band, means for separating the ornament from the band, and adjusting devices adapted and applied for skewing said wheels, substantially as and for the purpose set forth.

17. A molding-machine comprising a plurality of band-wheels, an endless band trained over said wheels and adapted to provide a traveling support for the plastic material to be treated, swiveled bearings for said wheels whereby such wheel can be skewed at will, adjusting devices adapted and applied for adjusting said wheel, means for driving said band, means for embossing or ornamenting said plastic material as it moves along with said band, and means for separating the ornament from the band.

18. A molding-machine comprising suitable band-wheels, an endless band trained over said wheels and adapted to provide a traveling support for the plastic material to be treated, means for driving said band, swiveled bearings for one of said wheels whereby such wheels can be skewed at will, adjusting devices adapted and applied for adjusting said wheels, springs applied to one of said wheels so as to permit such wheel to yield under an increased tension of the band, means for embossing or ornamenting the plastic material as it moves along with said band, and means for separating the ornament from the band.

19. A molding-machine comprising suitable band-wheels, an endless band trained over said wheels and adapted to provide a traveling support for the plastic material to be treated, the bearings for one of said wheels being swiveled in boxes or blocks which slide in ways, springs applied to said boxes or blocks for the purpose of permitting the wheel to yield under an increased tension of the band, adjusting devices adapted and applied for adjusting said boxes or blocks along the said ways, means for driving said band, means for embossing or ornamenting said plastic material as it moves along with said traveling band, and a knife for severing the ornament from the band.

20. A molding-machine comprising suitable band-wheels, an endless band trained over said wheels and adapted to provide a traveling support for the plastic material to be treated, means for driving said band, bearings for one of said wheels swiveled in boxes or blocks which slide in ways, threaded rods secured to said boxes or blocks, nuts on said rods, coil-springs arranged on the rods between the said nuts and the body-frame, means for embossing or ornamenting said plastic material as it moves along with said band, and a knife for severing the ornament from the said band.

adapted to emboss or ornament the said material as it moves along with said surface, means for guiding the plastic material to the said roll, adjustable trimmers for trimming off the surplus marginal portions of the plastic material after leaving the roll, an adjustable knife for shaving off the ornament, an adjustable scraper for separating the residue from said surface, and an adjustable deflector for directing the residue off at each side of said surface.

32. A molding-machine comprising a plurality of band-wheels, an endless band or belt trained over said wheels and adapted to provide a traveling support for the composition, a sprocket-chain for driving one of said wheels, idler-rolls for supporting said chain, said idler-rolls being so formed that they contact only with the side portions of the chain, means for embossing or ornamenting said material as it moves along with said band or belt, and means for separating the ornament from the band or belt.

33. A molding-machine comprising a moving or traveling support for the plastic material to be treated, means for embossing or ornamenting said material as it moves along with said traveling support, a rod arranged horizontally and transversely above said traveling support, and a couple of trimmers adjustably mounted upon said support and adapted to trim off the surplus marginal portions of said plastic material.

34. A molding-machine comprising a moving or traveling support for the plastic material to be treated, means for embossing or ornamenting said material as it moves along with said support, a rod arranged horizontally and transversely above said support and mounted for both horizontal and vertical adjustment, and a couple of plow-shaped trimmers adjustably mounted upon said rod and adapted to trim off the surplus marginal portions of said plastic material.

35. A molding-machine comprising a traveling or moving support for the plastic material to be treated, means for embossing or ornamenting said material as it moves along with said support, a rod arranged at each side of said support, a casting or clamping-piece arranged upon said rods, a socket-piece removably secured to the top of said clamping-piece, a stem secured in each socket-piece, a rod secured to the heads of said stems and extending horizontally above the said traveling support, and a couple of trimmers adjustably mounted upon said rod and adapted to trim off the surplus marginal portions of said plastic material.

36. A molding-machine comprising a traveling or moving support for the plastic material to be treated, means for embossing or ornamenting said material as it moves along with said support, trimmers arranged above said support and adapted to trim off the surplus marginal portions of the said plastic material, a rod arranged at either side of said support, a socket-piece adjustably clamped upon each rod, a stem secured in each socket-piece, and a roll journaled in the heads of said stems and arranged to bear against the under side of said support at a point under, or substantially under, the said trimmers.

37. A molding-machine comprising a moving or traveling support for the plastic material to be treated, means for embossing or ornamenting said material as it moves along with said support, a couple of circular cutters mounted for vertical adjustment and held down by spring-pressure upon the upper surface of said traveling support.

38. A molding-machine comprising a moving or traveling support for the plastic material to be treated, means for embossing or ornamenting said material as it moves along with said support, a vertically-adjustable frame carrying a couple of rotary disks having sharp edges which contact with the upper surface of said support, said frame being held down by spring-pressure, and adjusting devices adapted and applied for raising and lowering said frame and disks.

39. A molding-machine comprising an endless band or belt adapted to provide a traveling support for the plastic material to be treated, means for driving said band or belt, means for embossing or ornamenting said material as it moves along with said band or belt, a vertically-adjustable frame carrying a couple of disks having sharp edges which contact with the upper surface of said band or belt, the said frame being held down by spring-pressure, and suitable bevel-gearing and screws for raising and lowering said frame and disks.

40. A molding-machine comprising an endless band or belt adapted to provide a traveling support for the plastic material to be treated, means for driving said band or belt, means for embossing or ornamenting said material as it moves along with said band or belt, a vertically-adjustable frame carrying a couple of disks having sharp edges which contact with the upper surface of said band or belt, a rod extending through an opening in the lower portion of said frame and having its lower portion threaded, a shoulder on the upper end of said rod, a coil-spring arranged on said rod between said shoulder and said frame, a bevel-gear having a threaded bore which engages the threaded portion of said rod, a second bevel-gear engaging said first bevel-gear, and means for rotating said second bevel-gear, substantially as and for the purpose set forth.

41. A molding-machine comprising an endless metal band or belt adapted to provide a traveling or moving support for the plastic material to be treated, a shaft arranged transversely above said support, an impression-roll mounted upon said shaft, a bearing for said shaft arranged at each side of said roll, vertically-adjustable boxes to which said bearings are pivoted or trunnioned, housings 21. A molding-machine comprising a plurality of band-wheels having crowned peripheries, an endless steel band trained over said wheels and adapted to provide a traveling support for the plastic material to be treated, means for embossing or ornamenting the said plastic material as it moves along with said band, and a spiral knife arranged obliquely above the band at a point over one of said wheels, and adjusting devices adapted and applied for adjusting said knife and varying its angle and also for raising and lowering it and shifting it horizontally.

22. A molding-machine comprising an endless band or belt adapted to provide a traveling support for the plastic material to be treated, means for driving said band or belt, means for embossing or ornamenting the plastic material as it moves along with said band or belt, a bar rotatably mounted in vertically-adjustable blocks and arranged obliquely above the said band or belt, nuts for adjusting said blocks, a frame slidably mounted upon said bar, a screw for adjusting said frame, and a knife adjustably secured to said frame and adapted to separate the ornament from the band or belt.

23. A molding-machine comprising an endless band or belt adapted to provide a traveling support for the plastic material to be treated, means for driving said band or belt, means for embossing or ornamenting said plastic material as it moves along with said band or belt, a rod arranged at each side of the upper leaf of said band or belt, a knife adjustably mounted upon said rods and adapted to separate the ornament from the band or belt, and means for removing the residue therefrom, said means being also adjustably mounted upon said rods.

24. A molding-machine comprising an endless band or belt adapted to provide a traveling support for the plastic material to be treated, means for driving said band or belt, means for embossing or ornamenting said plastic material as it moves along with said band or belt, a rod arranged at each side of the upper leaf of said band or belt, trimmers adjustably mounted upon said rods and adapted to trim off the surplus marginal portions of the plastic material after having its central portion embossed or ornamented, and a knife for separating the ornament from the said band or belt.

25. A molding-machine comprising a plurality of band-wheels, an endless band or belt trained over said wheels and adapted to provide a traveling support for the composition, means for embossing or ornamenting said composition as it moves along with said band or belt, means for separating the ornament from the band or belt, rods arranged at either side of said band-wheels, and scrapers adjustably mounted upon said rods and adapted to scrape the peripheries of said wheels.

26. A molding-machine comprising an endless band or belt adapted to provide a traveling support for the plastic material to be treated, means for driving said band or belt, means for embossing or ornamenting said material as it moves along with said band or belt, vertically-disposed rods arranged at either side of said band or belt, and idler-rolls adjustably supported by said rods and adapted to support the upper leaf of said band or belt, substantially as and for the purpose set forth.

27. A molding-machine comprising a couple of band-wheels, an endless band or belt trained over said wheels and adapted to provide a traveling support for the plastic material to be treated, an impression-roll arranged over the upper leaf of said band or belt and adapted to emboss or ornament the said material as it moves along with said band or belt, means for separating the ornament from the band or belt, vertically-disposed rods arranged at either side of the band or belt, and idler-rolls adjustably supported by said rods and adapted to support the upper and lower leaves of said band or belt.

28. A molding-machine comprising an endless band or belt adapted to provide a traveling support for the plastic material to be treated, means for driving said band or belt, means for embossing or ornamenting said plastic material as it moves along with said band or belt, means for severing the ornament from the band or belt, means for removing the residue therefrom, and means for scraping the inner surface of said band or belt.

29. A molding-machine comprising an endless band or belt adapted to provide a traveling support for the plastic material to be treated, means for driving said band or belt, means for embossing or ornamenting said material as it moves along with said band or belt, a couple of plow-shaped trimmers provided with knives and adjustably supported and arranged for trimming off the surplus marginal portions of the plastic material after the central portion of the same has been embossed or ornamented, means for severing the ornament from the band or belt, and means for removing the residue therefrom.

30. A molding-machine comprising an endless band or belt adapted to provide a traveling support for the plastic material to be treated, means for embossing or ornamenting said material as it moves along with said band or belt, means for separating the ornament from the band or belt, a scraper for separating the residue from the band or belt, a supporting-roll for the band or belt arranged under the said scraper, and a deflector arranged in the rear of said scraper and adapted to remove the residue from the band or belt.

31. A molding-machine comprising a moving member having an endless exterior surface adapted to support the plastic material to be treated, means for driving said member, an impression-roll having a periphery arranged at each side of the upper leaf of said metal band or belt and providing guideways for said boxes, and adjusting devices adapted and applied for raising and lowering said boxes and thereby raising and lowering said shaft and roll.

42. The combination of an endless band or belt adapted to provide a traveling support for the plastic material to be treated, means for driving said band or belt, a vertically-adjustable shaft arranged above said band or belt, an impression-roll mounted upon said shaft, a pair of guides arranged to guide the plastic material to said roll and having telescoping or extensible connections with the body-frame whereby said guides can be adjusted laterally, a pair of rotary disks having sharp edges which contact with the upper surface of said band or belt and which cut through the plastic material after the same leaves the said roll, a pair of plow-shaped trimmers for trimming off the surplus marginal portions of the said material after being separated from the central portion by said rotary cutting-disks, a knife for shaving or cutting off the ornament, and means for removing the residue from the surface of the said band or belt.

43. The combination of the traveling band or belt, the rotary impression-roll, the laterally-adjustable guides, the laterally-adjustable cutting-disks, the laterally-adjustable plow-like trimmers, the crowned band-wheels over which said band or belt is trained, the spiral knife for shaving or cutting off the ornament, and means for removing the residue from said band or belt.

WILLIAM ZOELLER.

Witnesses:
　ARTHUR F. DURAND,
　ARTHUR G. OLSEN.